(12) United States Patent
Eidson

(10) Patent No.: US 7,778,283 B2
(45) Date of Patent: Aug. 17, 2010

(54) TIMING BRIDGE DEVICE

(75) Inventor: John C Eidson, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 411 days.

(21) Appl. No.: 11/757,445

(22) Filed: Jun. 4, 2007

(65) Prior Publication Data

US 2008/0298398 A1    Dec. 4, 2008

(51) Int. Cl.
*H04J 3/06* (2006.01)

(52) U.S. Cl. ....................... 370/503; 370/354

(58) Field of Classification Search ................. 370/503, 370/474, 496, 497, 498, 508, 516, 520, 522, 370/504, 505, 506, 507, 354
See application file for complete search history.

(56) References Cited

U.S. PATENT DOCUMENTS

| | | | | |
|---|---|---|---|---|
| 6,085,520 A | * | 7/2000 | Kohno | 60/414 |
| 6,744,782 B1 | * | 6/2004 | Itakura et al. | 370/466 |
| 7,447,931 B1 | * | 11/2008 | Rischar et al. | 713/400 |
| 2002/0186716 A1 | * | 12/2002 | Eidson | 370/503 |
| 2003/0152034 A1 | * | 8/2003 | Zhang et al. | 370/252 |
| 2005/0259754 A1 | * | 11/2005 | Ho et al. | 375/240.28 |

* cited by examiner

*Primary Examiner*—Huy D Vu
*Assistant Examiner*—Omer Mian

(57) ABSTRACT

A timing bridge device is used to gain boundary and transparent clock functionality using conventional network components on those network links that require good timing distribution. This timing path is invisible to the network component. The timing bridge device has an internal time clock and timestamps a received message according to the internal time clock when the message is received by a network device and when the message leaves the network device. The time associated with the message is then adjusted based on a determined transit delay.

3 Claims, 6 Drawing Sheets

TIMING BRIDGE DEVICE

BACKGROUND

In the field of telecommunications, wireless base stations include global positioning software (GPS) to synchronize among themselves. Installation and maintenance of GPS at each site is expensive. In dense urban environments, communication between the sites can be poor due to tall buildings and poor signal strength within them. Some base stations include dedicated backhaul timing circuits that are expensive. Other fields that require distributed precision time include packet switched telecommunications in metropolitan areas, control, test and measurement applications, and military systems.

In the aforementioned applications, the existing network, e.g. Ethernet, is used to accommodate the timing purposes as well as the traffic transport. To meet this requirement, Ethernet requires recovery of timing. Timing protocols, e.g. IEEE 1588 standard, can be implemented to recover time. Timing inaccuracies are introduced by the delays, delay asymmetries, and jitter from the following network related sources: physical layers, cables, and network devices, e.g. routers, switches, low-accuracy boundary clocks, and low-accuracy transparent clocks.

FIG. 1 illustrates a prior art system. A timing source, e.g. a grandmaster clock, communicates to two ordinary clocks via a series of network infrastructure components, e.g. switches, routers, repeaters, or low accuracy boundary clocks. In actual implementation, these are standard Ethernet switches and routers used establish network communications for the other devices shown. These devices introduce timing jitter that degrades the synchronization accuracy between the timing source and the ordinary clocks. One example is where the ordinary clocks are part of wireless micro-cell base stations within a large office building. In this case, the Ethernet forms the backhaul to the base station switch for data transmission. The synchronization is met with a separate and expensive time distribution system (not shown).

SUMMARY

A timing bridge device is used to gain boundary and transparent clock functionality using conventional network components on those network links that require good timing distribution.

DETAILED DESCRIPTION

A dedicated timing path is provided around a device, e.g. switch or router, that inherently introduces timing jitter in a network. This timing path is invisible to the device.

Figure 1:
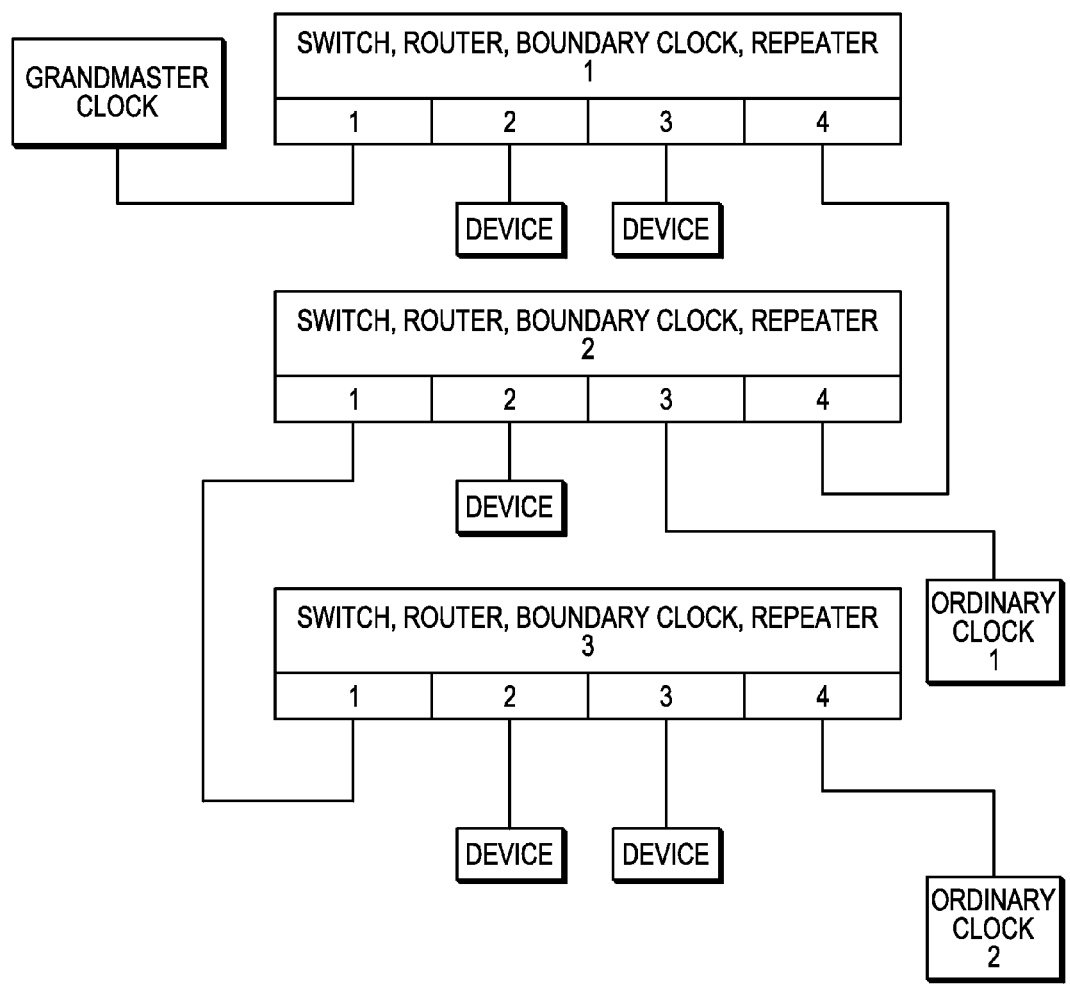
FIG. 1 illustrates an applications requiring timing.
Figure 2:
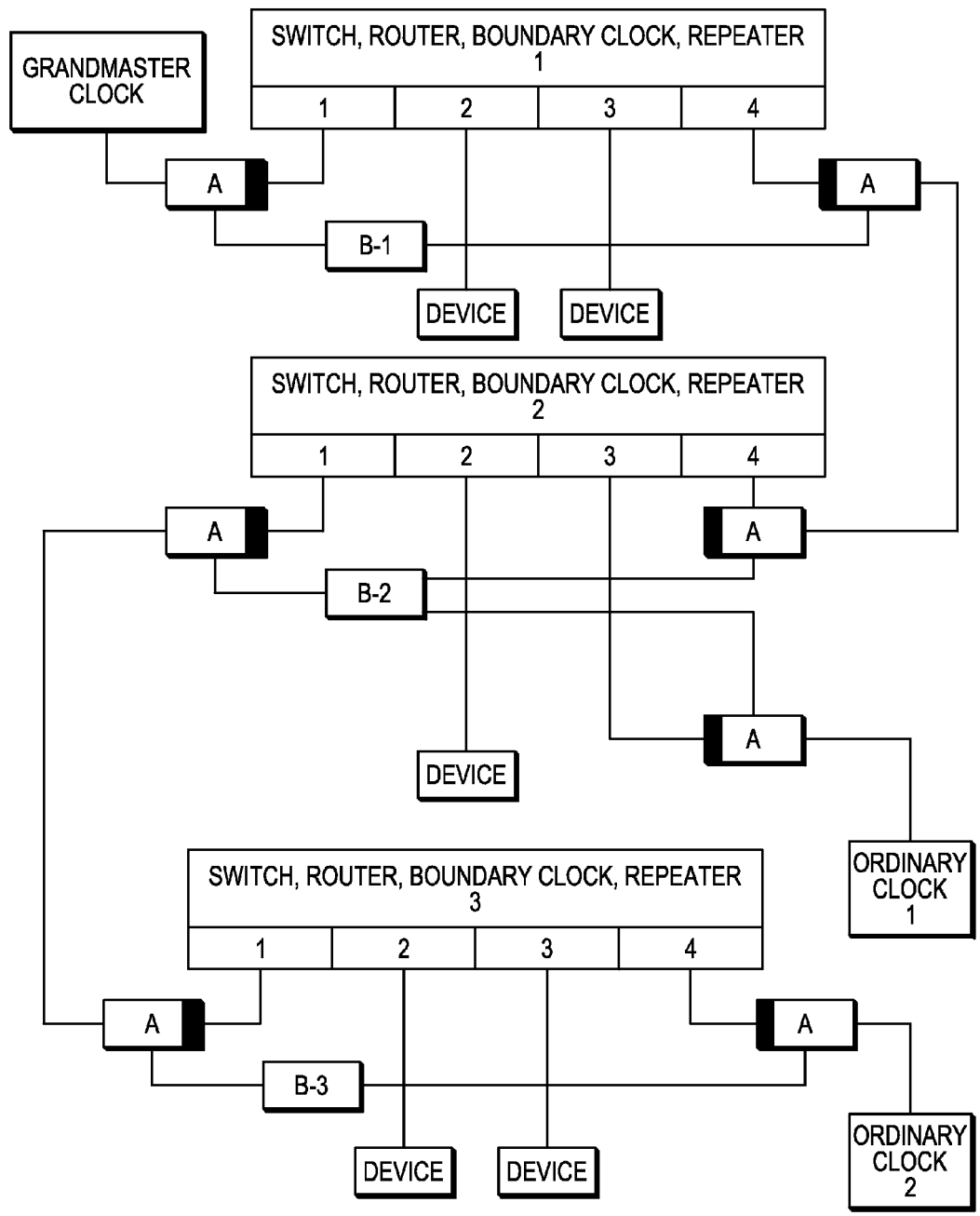
FIG. 2 illustrates a diagram of the present invention.

FIG. 2 illustrates an embodiment of the dedicated timing system. In this system, each network infrastructure element $N_x$ is bridged by a collection of devices A, B-x, A, where x is an integer.

Each bridge transfers the time to eliminate any jitter in the device and thereby improves the accuracy within the system. To keep costs minimized, the bridges can be introduced solely in the network paths between the timing source and the devices that require good timing.

Figure 3:
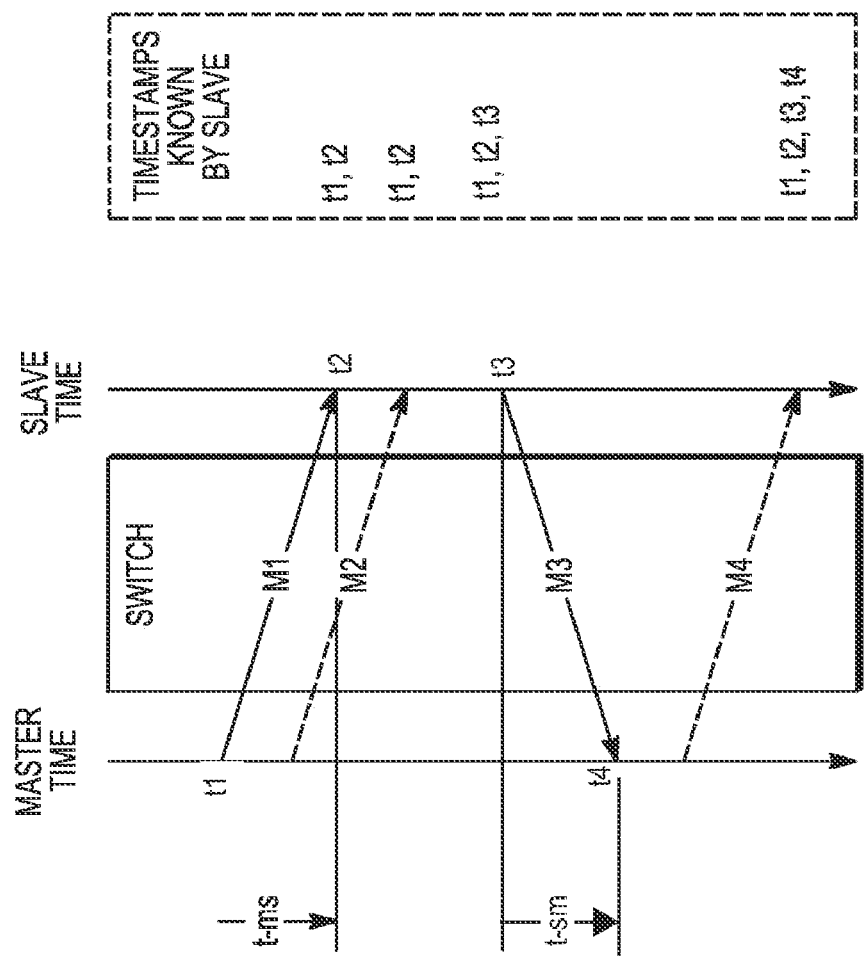
FIG. 3 illustrates a timing diagram of the bridges.

FIG. 3 illustrates a timing diagram for a timing bridge device. Most network based synchronization protocols exchange timing messages between at least two clocks. In general, the timing protocols have similar principles with minor differences in implementation. To facilitate understanding, IEEE 1588 will be used in this example.

A master sends a message M1, e.g. Sync, to the slave. Both master and slave timestamp the message as close to the network interface as possible (t1 and t2). The timestamp generated at the master, t1, is sent to the slave as a field in the Sync message or in a non-time critical message M2, e.g. Follow_Up. The process is reversed with the slaved sending a message M3, e.g. Delay_Req, to the master. Both master and slave timestamp the message as close to the network interface as possible, t3 and t4. The timestamp generated at the master, t4, is sent to the slave in a non-time critical message M4, e.g. Delay_Resp. Once the slave has all four timestamps t1, t2, t3, and t4, it can compute the mean propagation time (t−ms+t−sm)/2 and the clock offset.

The timed messages, M1 and M3, pass through a switch that includes variable delay (jitter) that introduces uncertainty into the computation of delay and offset.

Figure 4:
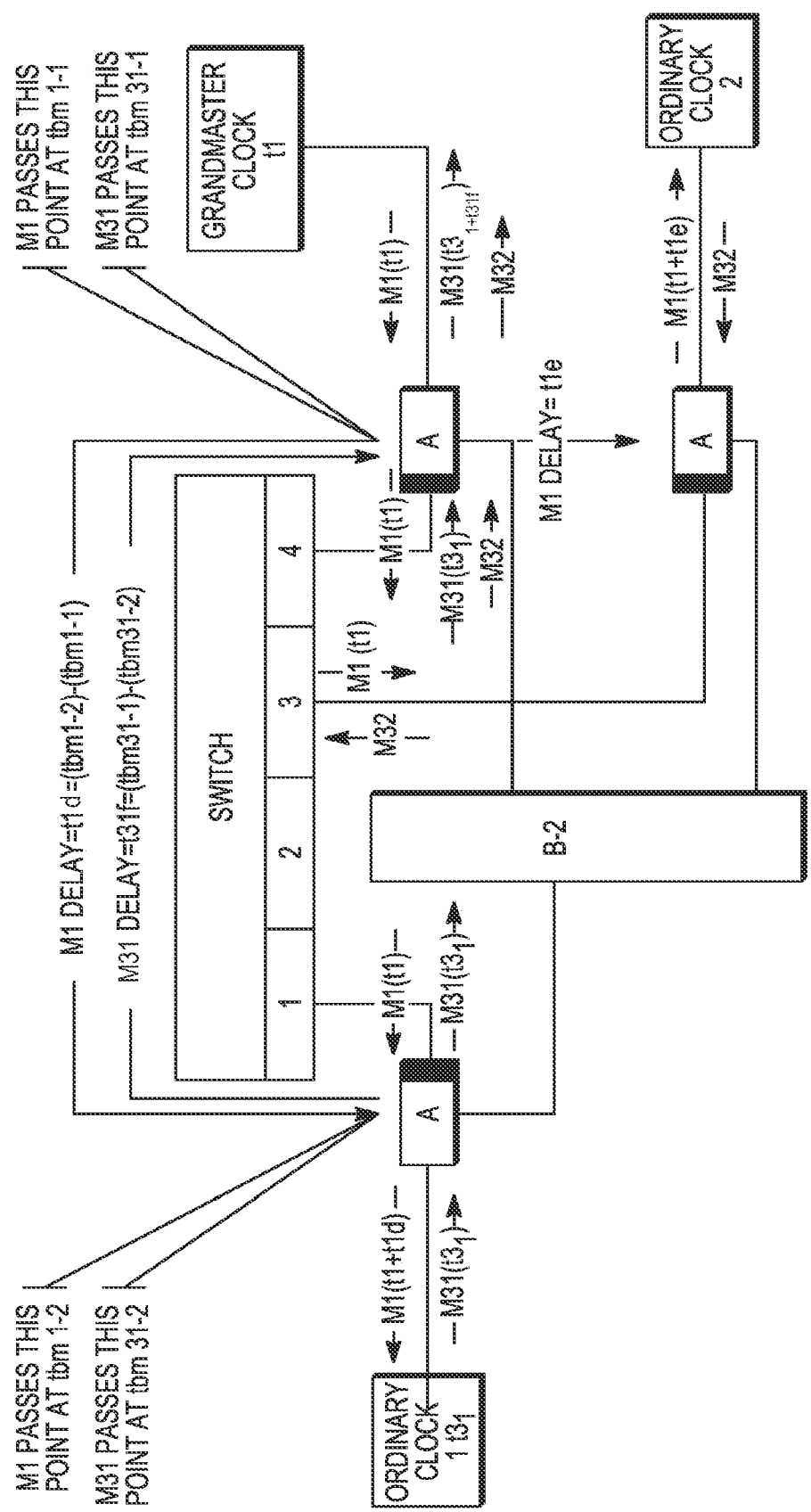
FIG. 4 illustrates a block diagram for the time bridge device.

This delay is removed by the time bridge device shown in FIG. 2 and shown in more detail in FIG. 4. The example is shown where the infrastructure device is a switch router, or repeater. In FIG. 4, just an equivalent portion of the original system is shown.

The path from the grandmaster clock to an ordinary clock, clock 1, is described. At the upstream side of the switch, e.g. the side toward the grandmaster, a M1 message arrives that contains a timestamp t1. This message is timestamped at entry with timestamp (tbm1-1), e.g. the time the packet entered this device is read on the internal timer clock B-2 of the bridge. The message passes through the switch and at the output "A" unit headed to ordinary clock, the timestamp (tbm1-2) is generated based on the timer B-2. The actual delay experienced by M1 within the switch t1$d$=(tbm1-2)−(tbm1-1) as illustrated. This value is added to the timestamp t1 or to a correction field contained in M1 as it leaves the bridge. A similar process occurs for M3 messages going from ordinary clocks to the grandmaster. The net result is that the recipients of timing messages, e.g. a master clock in the case of M3, and a slave in the case of M1, also receive information that enables the correction of the timestamps for the time the messages spend in the switch. This effectively removes the timing jitter.

Figure 5:
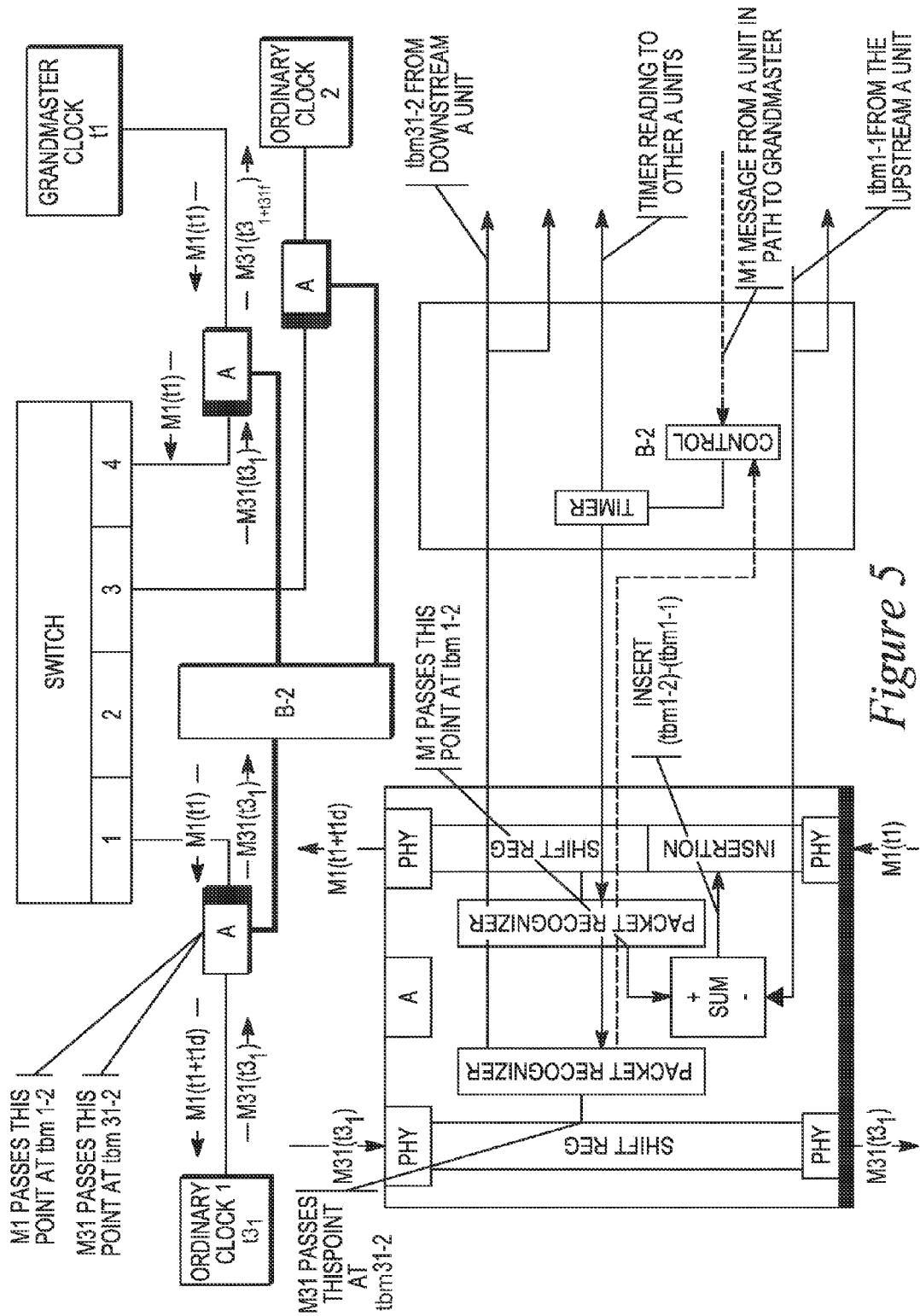
FIG. 5 illustrates an embodiment of the internals of the bridge components.

FIG. 5 illustrates an embodiment of the internals of the bridge components. The timing unit "B" contains a timer, a free running or possibly syntonized clock. All "A" units have time calibrated access paths to this timer so that when a timing packet is detected by one of the packet recognizers an appropriate timestamp can be generated. These timestamps are used to compute the delay or residence time of a timing message within the switch and these correction values from all switches in the path are used by the slave to correct the timestamps received by the master. It is important that all devices share the same calibration of the second, to the required accuracy, as the grandmaster.

Since the oscillators driving such timers and the grandmaster clock itself are typically 0.01% accurate, the error in computing a residence time in the switch can be as much as 0.02%. If this is significant compared to the required accuracy, then additional functionality is added to the B unit to allow syntonization with the grandmaster, e.g. adjust the frequency to agree to better than the 0.02%. This is done based on the B unit receiving the actual message M1 and over time using this information to adjust the timer rate. This information if required would be picked up by any A unit receiving a M1 message and transferred over the dotted channel to the B units control circuits. To illustrate, when the residence time is 1 ms and the oscillator mismatch is 0.02%, the error in measuring the residence time is 200 ns which for high accuracy applications is unacceptable. However, for accuracies of several microseconds this may be satisfactory. Syntonizing to provide an oscillator (timer mismatch) of 0.00002% reduces the inaccuracy to 0.2 ns. In this instance, the packet recognizers need to deliver the receipt timestamp for M1 messages and the timestamp inserted by the grandmaster (t1) or pass the entire message to the B-2 control circuits where it can be extracted.

Suitable packet recognizers, such as disclosed in U.S. Pat. No. 5,566,180, can distinguish M1 or M3 messages. When a M1 or M3 message is detected, the packet recognizer takes a snapshot of the B-2 timer and passes this information to the correct place as follows:

For an inbound M1 or M3 message, the timestamps are delivered to all other A units.

For an outbound M1 or M3 message, the timestamp is delivered to the adder in the same A unit.

For outbound M message at an A unit, the local outbound timestamp is fed to the positive (+) side of the adder while the timestamp received from the A unit that detected this same message on the inbound side is fed to the negative (−) side. The difference is inserted in the outbound M message. The necessary corrections to CRCs are done as the packet leaves the A unit as part of the insertion process. To illustrate, for IEEE 1588, the insertion process can be done between the physical layer (PHY) and the media access control layer (MAC).

To associate the inbound and outbound timestamps with the same message, one of the following may be done:

The inbound timestamps plus enough other data to correctly associate this timestamp with the outbound packet on the companion A units is passed to the companion units via a channel connects A units via the controller in the B unit indicated by the dashed lines in FIG. 5. In this embodiment, the only on-the fly modification of the timing packets occurs in the outbound A unit, as illustrated in FIG. 5.

Figure 6:
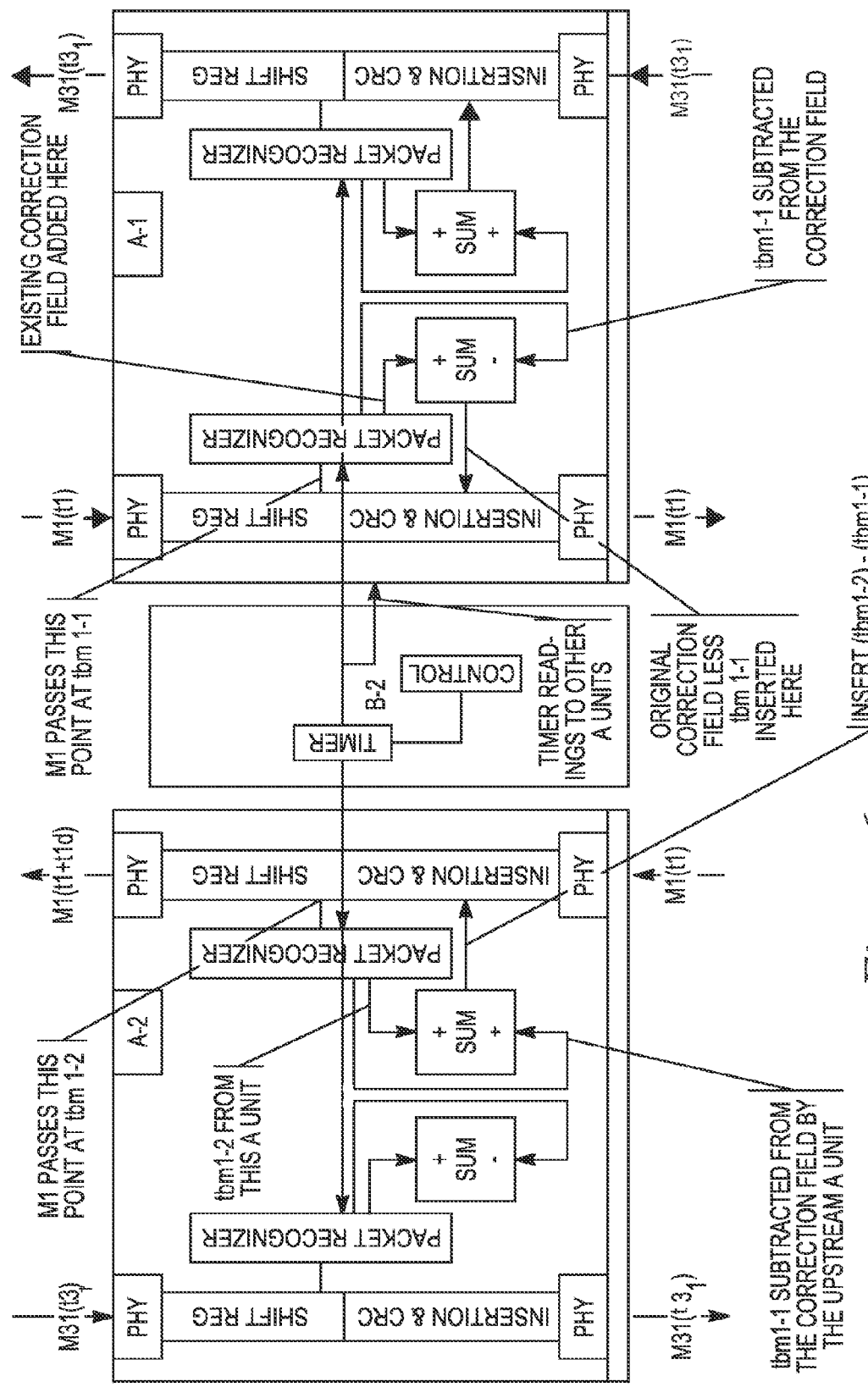
FIG. 6 shows the details for the M1 message inbound on A-1 and outbound on A-2.

The inbound timestamp is subtracted by the inbound A unit from a designated field or part of a special "extension" field already present in the timing packet. The outbound time stamp is added by the outbound A unit to the correction field thus generating the difference. For IEEE 1588 V2, this designated field is the "correction field". The additional A unit functions on the inbound side for this are shown in FIG. 6. FIG. 6 shows the details for the M1 message inbound on A-1 and outbound on A-2. Alternatively, the timestamp contained in the message can be corrected.

The slaves that receive the timing packets must know which of the above variants is used. For example, when the residence time corrections computed by the A units in upstream switches has been included into the timing message timestamps then the slave does not need to do any additional processing beyond that implied by the normal protocol described in the discussion of FIG. 3. When the residence time corrections have been accumulated in a correction field, whether native in the packet or part of a special extension field, this accumulated correction must be added appropriately to the timestamp by the slave. In practice, if the device of the invention includes the correction in the timestamp, it should not modify the correction field and vice versa. If this is done, the slave can simply add the correction field timestamp and will always get the correct results.

The aforementioned description is appropriate for switches, repeaters, and routers.

To improve the accuracy of boundary clocks, the boundary clock must be made to look like an ordinary switch for the corrected packets. At the same time, the boundary clock must receive timing packets for use on other ports not requiring the corrections for higher accuracy. This can be done by operating two independent timebases from the grandmaster clock. One timebase is used by the low accuracy components, e.g. boundary clocks and ordinary clocks, while the other uses the timing bridge device to bypass the boundary clocks. The slaves requiring high accuracy use the high accuracy timebase. The grandmaster clock ensures that both timebases are synchronized by running the protocol off of a common clock.

The boundary clock must appear like an ordinary switch to the second timebase. The inbound A unit change an appropriate feature of the packet while meeting the following criteria:

It no longer appears as a timing packet.

The same "networking addressing" is maintained so that it is correctly routed by the switch function of the boundary clock.

It is recognized by the outbound A unit as a timing packet.

The outbound A units then restore the modified feature. For IEEE 1588 on Ethernet layer 2, the multicast Ethernet addresses would not be modified but the layer 2 Ethertype assigned to IEEE 1588 could be changed to another Ethertype assigned for this purpose. The boundary clock would recognize the first as 1588 but would treat the second as a non-1588 packet, i.e. appear as an ordinary switch. At the internet protocol (IP) level, the same thing could be done with different port numbers, i.e. translating the 1588 assigned numbers 319 and 320 into to different numbers assigned to this technique. If the boundary clocks are designed to ignore some protocol specific "scoping" field, e.g. IEEE-1588 "subdomain" field, then the same technique may be applied.

Alternatively, the time bridge device may be designed to respond solely to the second timebase with the second timebase selected such that the boundary clocks do not parse the packets as timing packets but simply operate as a switch. In this embodiment, the ordinary clock receiving these high accuracy packets must also recognize solely the second timebase.

The timing bridge device requires that the paths implemented by designed to ensure that there are no loops and the grandmaster clock is visible from all slaves needing the service. Further, the grandmaster clock has the capability of supporting the number of slaves using the service. Boundary clocks, as described by IEEE 1588, eliminate these loops and limit the loads on any given master clock.

Although the A and B units have been described as separate components linked together via wires, it is possible to have all the A units and the B units implemented in a single box, integrated circuit, or field programmable gate array. The integrated solutions permit better timing performance by minimizing the distance and calibration needed between the timer in the B unit and the packet recognizers in the A units. Locating all A units in a single device requires short cables from the switch side of the A units (the side with the dark band in the Figures) to the switch itself. Since these cables appear between two A units, their delays are indistinguishable from delays in the switch itself and can be corrected as has been described.

I claim:

1. A system comprising:
   at least two network devices electrically connected, each device connected to a timing bridge device having an inbound path and an outbound path,
   each path including,
      a shift register interposing a physical layer and a media access control layer,
      a packet recognizer receiving the output of the shift register, the shift register loading a message,
   the inbound path further including an adder, having a positive input connected to its packet recognizer and a negative input, having an output connected to its shift register for adjusting timing in the message, and
   the outbound path further including an adder, receiving a first and a second input from its packet recognizer and an output connected to its media access control layer;
   a timer connecting to the packet recognizer of the inbound and the outbound path, generating timer readings; and
   a controller connecting to the timer and the packet recognizer of the outbound path, receiving external control signals;
   wherein the packet recognizers have time calibrated access paths to the timer so that when a timing packet is detected by one of the packet recognizers an appropriate timestamp can be generated.

2. A device comprising:
   a timer;
   an inbound unit that receives a message having one of a correction field and a timestamp, the inbound unit including:
      an inbound physical layer via which the message is received;
      an inbound media access control (MAC) layer that receives the message from the inbound physical layer;
      an inbound shift register interposing the inbound physical layer and the inbound MAC layer through which the message passes;
      an inbound packet recognizer connected to an output of the inbound shift register, wherein the inbound packet recognizer recognizes the received message as a timing message; and
      an inbound adder that subtracts a time obtained from the timer from the one of a correction field and a timestamp of the timing message when the received message is recognized as a timing message; and
   an outbound unit that transmits the timing message; the outbound unit including:
      an outbound physical layer via which the timing message is transmitted;
      an outbound media access control (MAC) layer that sends the timing message to the outbound physical layer; and
      an outbound shift register interposing the outbound physical layer and the outbound MAC layer through which the message passes;
      an outbound packet recognizer connected to an output of the outbound shift register, wherein the outbound packet recognizer recognizes the timing message; and
      an outbound adder that adds a time obtained from the timer to the one of a correction field and a timestamp of the timing message when the timing message is recognized by the outbound packet recognizer.

3. A device according to claim 2, further comprising:
   a controller connected to the inbound packet recognizer to receive external control signals therefrom for adjusting a timer rate of the timer.

\* \* \* \* \*